United States Patent [19]

Landry et al.

[11] Patent Number: 4,704,335

[45] Date of Patent: Nov. 3, 1987

[54] HIGHLY FLEXIBLE SILICONE RUBBER INORGANIC SLEEVING

[75] Inventors: Louis G. Landry, Somersworth; Fabian Nunez, Dover, both of N.H.

[73] Assignee: Essex Group, Inc., Ft. Wayne, Ind.

[21] Appl. No.: 665,200

[22] Filed: Oct. 26, 1984

Related U.S. Application Data

[63] Continuation-in-part of Ser. No. 548,593, Nov. 3, 1983, abandoned.

[51] Int. Cl.[4] .......... B32B 9/00

[52] U.S. Cl. .......... 428/36; 428/365; 428/376; 428/391; 428/392; 428/398; 428/429

[58] Field of Search .......... 428/36, 188, 365, 375, 428/392, 391, 429, 398, 376; 174/110 S, 122 G

[56] References Cited

U.S. PATENT DOCUMENTS

| | | | |
|---|---|---|---|
| 2,258,221 | 10/1941 | Rochow | 174/110 S |
| 2,504,388 | 4/1950 | Braley | 428/429 |
| 2,590,493 | 3/1952 | Berberich et al. | 428/429 |
| 2,979,479 | 4/1961 | Modic | 174/110 S |
| 3,588,318 | 6/1971 | Ollis | 174/110 S |
| 3,889,023 | 6/1975 | Plueddemann | 428/429 |
| 4,452,279 | 6/1984 | Atwell | 138/126 |

FOREIGN PATENT DOCUMENTS

| | | | |
|---|---|---|---|
| 0156607 | 5/1954 | Australia | 174/122 G |
| 0077665 | 4/1983 | European Pat. Off. . | |
| 2140325 | 11/1984 | United Kingdom | 428/429 |

*Primary Examiner*—Lorraine T. Kendell
*Attorney, Agent, or Firm*—Alan C. Cohen

[57] ABSTRACT

The present invention is directed toward a highly flexible, silicone rubber coated inorganic yarn based sleeving and a process for making the invention comprising an inorganic yarn sleeving, i.e., glass fibers, formed into a sleeving which is then coated with a highly flexible silicone rubber which has a Shore-A durometer reading of about 40 or less of the cured silicone material.

2 Claims, 1 Drawing Figure

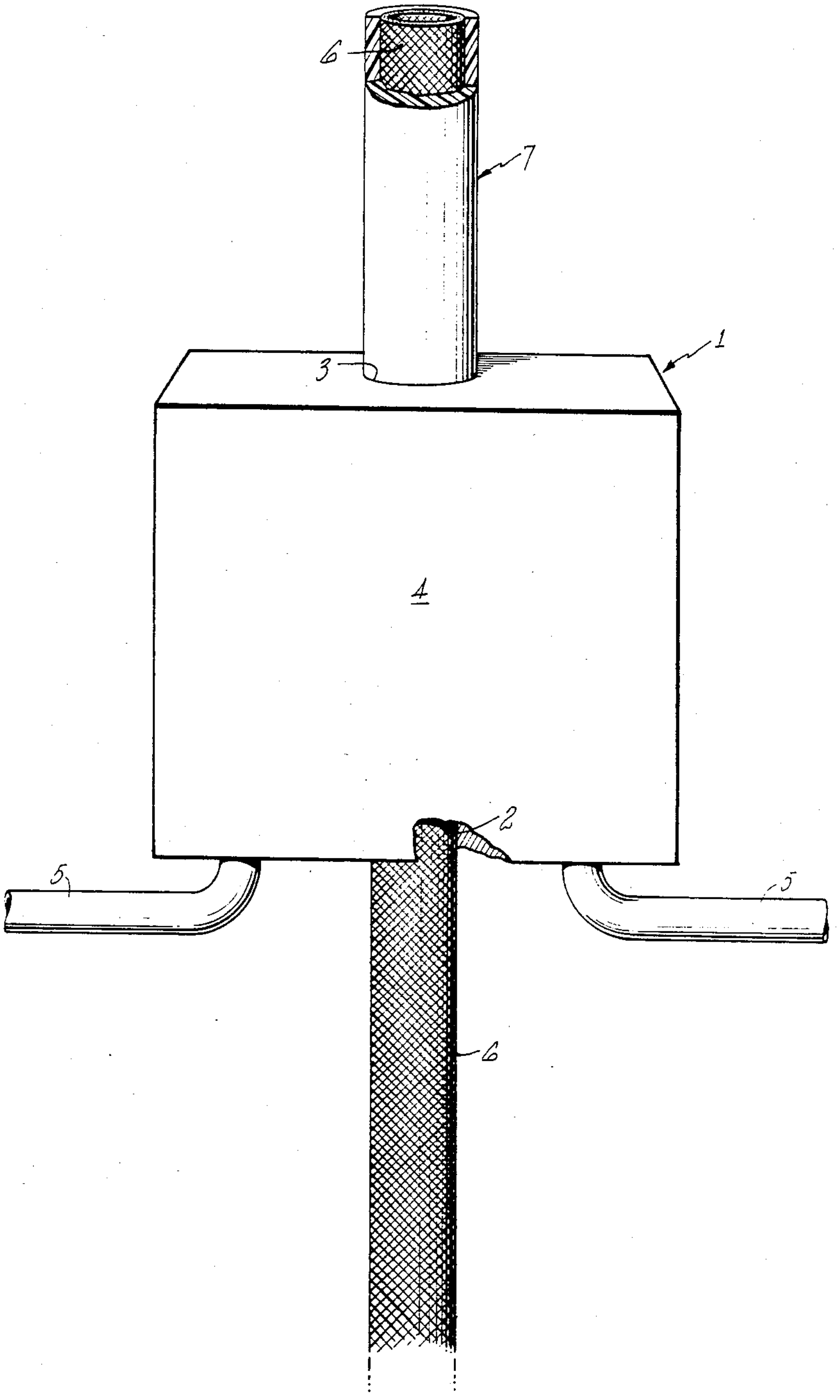
6
7
1
3
4
2
5
5
6

HIGHLY FLEXIBLE SILICONE RUBBER INORGANIC SLEEVING

CROSS REFERENCE TO RELATED APPLICATION

This application is a continuation-in-part of U.S. application Ser. No. 548,593, filed Nov. 3, 1983 for HIGHLY FLEXIBLE SILICONE RUBBER COATED INORGANIC YARN SLEEVING filed by L. G. Landry and F. Nunez, and now abandoned.

DESCRIPTION

1. Technical Field

The field of art to which this invention pertains is insulation sleeving and particularly silicone rubber coated inorganic yarn based sleeving.

2. Background Art

Silicone rubber coated inorganic yarn sleeving is well known in the art. Sleeving of this type provides electrical insulation at high operating temperatures. It is recommended for apparatus leads, appliance and fixture wire insulation, heating cable, ignition systems, relay leads and aircraft wire where a 200° C. thermal rating is required.

Sleevings of this type offer superior cut-through resistance, excellent resistance to chemical attack as well as abrasion resistance and moisture resistance. However, the sleeving of the present state of the art offers limited flexibility. This limited flexibility increases the difficulty and the effort required to apply the insulation to conductors with complex configurations and in locations with limited accessibility. Therefore, what is needed in this art is a high temperature, highly flexible silicone rubber coated inorganic yarn based sleeving which will ease the application of said sleeving in such complex configurations.

DISCLOSURE OF INVENTION

The present invention is a highly flexible silicone coated, inorganic yarn based sleeving having excellent electrical and thermal properties. The sleeving comprises a high temperature inorganic yarn such as fiberglass overcoated with an electrically insulating, high temperature, highly flexible silicone coating having a Shore-A durometer reading less than 40.

Another aspect of this invention is a method of producing this highly flexible silicone coated inorganic yarn based sleeving.

The foregoing and other features and advantages of the present invention will become more apparent from the following description and accompanying drawing.

BRIEF DESCRIPTION OF DRAWINGS

The FIGURE depicts the process of applying the silicone to the inorganic yarn based sleeving.

BEST MODE FOR CARRYING OUT THE INVENTION

The present invention is comprised of a high temperature inorganic yarn sleeving overcoated with a highly flexible silicone rubber. The inorganic yarn which may be used to practice this invention may be any high temperature, electrically insulating, flexible, ceramic or vitreous type yarn.

The high temperature yarn is then fabricated into the shape of the sleeving, which is generally tubular, by any number of well known techniques such as knitting, braiding, weaving etc. The preferred material being ECG type fiberglass, nontexturized yarn. These materials typically have densities of about 180,000 yds/lb to about 234 yds/lb and are woven or knitted with about 15 to about 50 pics/in with the preferred being about 30 to about 35 pics/in. The preferred densities range from about 1250 yds/lb to about 15,000 yds/lb. The dimensions of the yarn are primarily limited by the degree of flexibility desired in the final product. In general though, the diameter of such yarns ranges from about 0.006 inch (0.152 mm) to about 0.050 inch (1.27 mm), while the diameter of the tube will range from about 0.025 inch (0.635 mm) to about 2.0 inch (50.8 mm).

The silicone rubbers used to overcoat this invention are, but not limited to, addition reaction, curable vinyl-functional, dimethyl siloxane polymers having suitable catalyst and cross-linking agents or room temperature vulcanizing silicone rubber blends, and should have a Shore-A durometer reading of about 40 or less. A number of such materials are commercially available and a list of those which have been particularly useful may be found in Table I along with their respective durometer readings.

TABLE I

| Material | Shore-A |
|---|---|
| Gen. Electric SLE 5600/5300 | 40 |
| Dow Corning Q3-9590 | 35 |
| Gen. Electric SLE 5500 | 28 |

Any of the aforementioned silicone rubbers may be used as formulated or may be modified to improve their flame retardance, thermal stability, etc., by addition of conventional modifiers.

Although any conventional method of making silicone coated inorganic yarn sleeving may be used to practice this invention, the preferred procedure is as follows:

The high temperature, inorganic yarn sleeving is fabricated into a continuous tube having the desired dimensions as described above. The sleeving is then conditioned by exposing it to sufficient heat to remove any sizing, broken filaments as well as to thermally stabilize it. Generally, this may be accomplished by drawing it through an open gas flame or an oven. The temperature should be high enough to remove the sizing but care must be taken not to allow the sleeving to melt causing it to become brittle and lose its flexibility.

Referring to the FIGURE, the conditioned sleeving 6 is then drawn through a die 1, where the silicone rubber is pressure bonded to it. The die 1 comprises an entry port 2, an exit port 3, a conduit 4 and inlets 5 for the introduction of the silicone rubber into the conduit where it is bonded to the sleeving 6. This FIGURE is merely exemplary and is not limiting; any other conventional techniques for pressure bonding coatings to sleeving may be used.

The conditioned sleeve 6 is drawn into the die 1 through the entry port 2. The size of this port should be just large enough to allow for easy passage of the sleeving without causing crimping or collapsing of the sleeving. As the sleeving passes through the conduit 4, it is contacted with the silicone rubber which is introduced into the conduit 4 under pressure via the inlets 5. The silicone, due to it being under pressure, pressure bonds to the sleeving 6 and the coated sleeving 7 exits the die through the exit port 3. This exit port 3 has an inside diameter which is defined by the required silicone rubber wall. In general, the conditioned sleeving is drawn through the die at speeds ranging from about 1 ft/min to about 40 ft/min. The particular speed at which the sleeving is drawn through the die is a function of the pressure at which the silicone is introduced into the conduit and the thickness of the silicone coating desired. The pressure at which the silicone rubber is introduced into the conduit 4 will vary also, depending on the speed at which the sleeving is towed through the die. In general, this pressure will range from about 1 psi to about 100 psi with the preferred range being from about 40 psi to about 70 psi. The coated sleeving is then passed into a curing oven which cures the silicone rubber forming the finished silicone rubber coated sleeving. This curing may be accomplished by exposing the silicone rubber coated sleeving to any conventional curing apparatus which may be used to cure silicone rubber and would be known to those skilled in the art. These may include, but should not be limited to radiant heat, convection heat, microwave, infrared or hot air vulcanization. In general, rubbers of this type cure at temperatures from about 190.6° C. to about 204.4° C.

It should be noted that in order to fabricate a silicone rubber coated sleeving of the present invention, with optimum physical properties, as little entrapped air as possible should be introduced into the rubber coating, for this may create voids in the cured material reducing the quality of the final sleeving. Sleeving of this type may be made using any wall thickness desired, however, generally the silicone coating will be between about 5 mils to about 80 mils.

Electrical insulating sleeving of this type is required to conform to certain strict industry standards concerning their physical and electrical properties before they may be used in certain applications. These standards are well known to those skilled in the art and include ASTM, Underwriters Lab, NEMA, and the U.S. Military specifications. The sleeving of the present invention meets or exceeds all of these applicable standards as well as being substantially more flexible.

EXAMPLE

A highly flexible silicone rubber coated fiberglass sleeving having an ID of 0.080 inch and an OD of 0.180 inch was produced using the following method.

Fiberglass sleeving made on a 32 carrier NE Butt Braider having yarns of ECG-150 $\frac{1}{3}$ type, thirty-five pics to the inch on a 0.102 inch rod was drawn through a gas flame at 140 ft/min to remove broken fibers, sizing and to heat stabilize it. It was then drawn at a towing speed of 7 ft/min into a die which had a bottom aperture of 0.098 inch (2.49 mm). General Electric SLE 5500 silicone rubber, which was mixed in proper proportions on a Fluid Automation meter/mix machine, was introduced into the die mechanism under 60 psi pressure. The silicone rubber contacted the sleeving as it passed through the die pressuring bonding it to the fiberglass sleeving. The coated sleeving was then drawn through the aperture of the top die which was 0.221 inch (5.61 mm) in diameter.

The silicone rubber coated fiberglass sleeving was then drawn through a 30 foot high electrically heated curing oven. The curing temperature of this particular silicone rubber polymer is about 400° F. (204° C.) so the tower has a temperature profile from bottom to the top of about 204.4° C. to about 260° C. Upon exiting from the top of the oven, the sleeving had the characteristics outlined in Table II.

TABLE II

| Property | Value |
|---|---|
| Inside diameter | .081" (2.06 mm) |
| Outside diameter | .180" (4.57 mm) |
| Fiberglass wall thickness | .013" (.33 mm) |
| Silicone rubber wall thickness | .036" (.91 mm) |
| Dielectric breakdown voltage | |
| (a) average | 27,000 volts |
| (b) minimum individual | 26,000 volts |
| Durometer Reading | 28 |
| Flexibility | 45 grams |

While no universally accepted test to determine the flexibility of sleeving of this type exists, a test was developed which would allow relative flexibility among similar sleevings to be determined. The test measured the maximum force required to bend a particular sleeving from a straight configuration to about a 45° or greater configuration. This force was measured using a Chatillon push/pull gauge and was measured in grams. Since there is no absolute standard to which given results may be compared, relative flexibility is measured by comparing a standard commercially available silicone rubber coated fiberglass sleeving with the new highly flexible silicone rubber coated fiberglass sleeving. The only difference between these commercial sleevings and those of the present invention is the silicone rubber that is used to produce the sleevings. The results of this test can be seen in Table III, note that the smaller value indicates a more flexible product. Sleeving "A" represents the old sleeving while sleeving "B" represents the present inventive sleeving.

TABLE III

| Sleeving Size (ID) inch | Previous Sleeving A Critical Bend Force | Present Sleeving B Critical Bend Force |
|---|---|---|
| .250 | 81 grams | 60 grams |
| .311 | 150 grams | 100 grams |
| .141 | 87 grams | 40 grams |
| .198 | 110 grams | 55 grams |

Silicone rubber coated inorganic yarn based sleeving of the present invention offers a uniquely flexible, high operating temperature electrically insulating sleeving having a working range of −70° C. to 220° C. The increased flexibility of the sleeving will aid in applying the sleeving in areas where stiffer materials make such application difficult.

Additionally, it has been found that the adhesion of the silicone rubber to the fiber substrate is markedly improved over that of prior art materials. This leads to a stronger, more durable product.

It should be understood that the invention is not limited to the particular embodiments shown and described herein, but that various changes and modifications may be made without departing from the spirit and scope of this novel concept as defined by the following claims.

We claim:

1. A highly flexible, electrically insulating, silicone coated, inorganic yarn based sleeving consisting essentially of; a flexible inorganic yarn sleeving of nontexturized glass fibers pressure bonded to a highly flexible vinyl functional dimethyl siloxane rubber, said rubber having a Shore-A durometer hardness of 40 or less.

2. The article of claim 1 wherein the inorganic yarn sleeving comprises glass fibers having about 15 pics/in to about 50 pics/in.

* * * * *